United States Patent

[11] 3,549,171

| [72] | Inventor | Manuel Katz |
| | | Canton, Ohio |
| [21] | Appl. No. | 769,576 |
| [22] | Filed | Oct. 22, 1968 |
| [45] | Patented | Dec. 22, 1970 |
| [73] | Assignee | Buxbaum Products Company |
| | | Canton, Ohio |
| | | a corporation of Ohio |

[54] VEHICLE GUARD AND MOUNTING ASSEMBLY
9 Claims, 3 Drawing Figs.

[52] U.S. Cl. .................................................. 280/154.5
[51] Int. Cl. .................................................. B62d 25/16
[50] Field of Search .......................................... 280/154.5

[56] References Cited
UNITED STATES PATENTS

| 1,807,039 | 5/1931 | Keizer | 280/154.5 |
| 1,904,342 | 4/1933 | Zaiger et al. | 280/154.5 |
| 2,414,676 | 1/1947 | Taurman | 280/154.5 |
| 2,653,846 | 9/1953 | Wiley | 280/154.5 |
| 2,683,612 | 7/1954 | Bacino | 280/154.5 |
| 2,777,710 | 1/1957 | Panchesine | 280/154.5 |
| 2,831,702 | 4/1958 | Eaves et al. | 280/154.5 |
| 2,935,336 | 5/1960 | Case | 280/154.5 |
| 3,027,178 | 3/1962 | Eaves | 280/154.5 |
| 3,059,945 | 10/1962 | Robb | 280/154.5 |
| 3,319,976 | 5/1967 | Eckermann | 280/154.5 |

Primary Examiner—Banjamin Hersh
Assistant Examiner—Robert R. Song
Attorney—Teare, Teare & Sammon ABSTRACT: A splash guard and mounting assembly for use on vehicles including a mounting bracket having a cartridge retainer member for connection with the vehicle frame for mounting a flexible, cartridgelike headed splash guard in slidable telescopic disconnect relation therein for ready installation or removal therefrom. An antisail device pivotally coacts in cantilevered relation with the mounting bracket for substantially rigid engagement with the splash guard to selectively limit its rearward swinging movement upon forward movement of the vehicle and for yieldable engagement with the guard to control its forward swinging movement upon rearward movement of the vehicle.

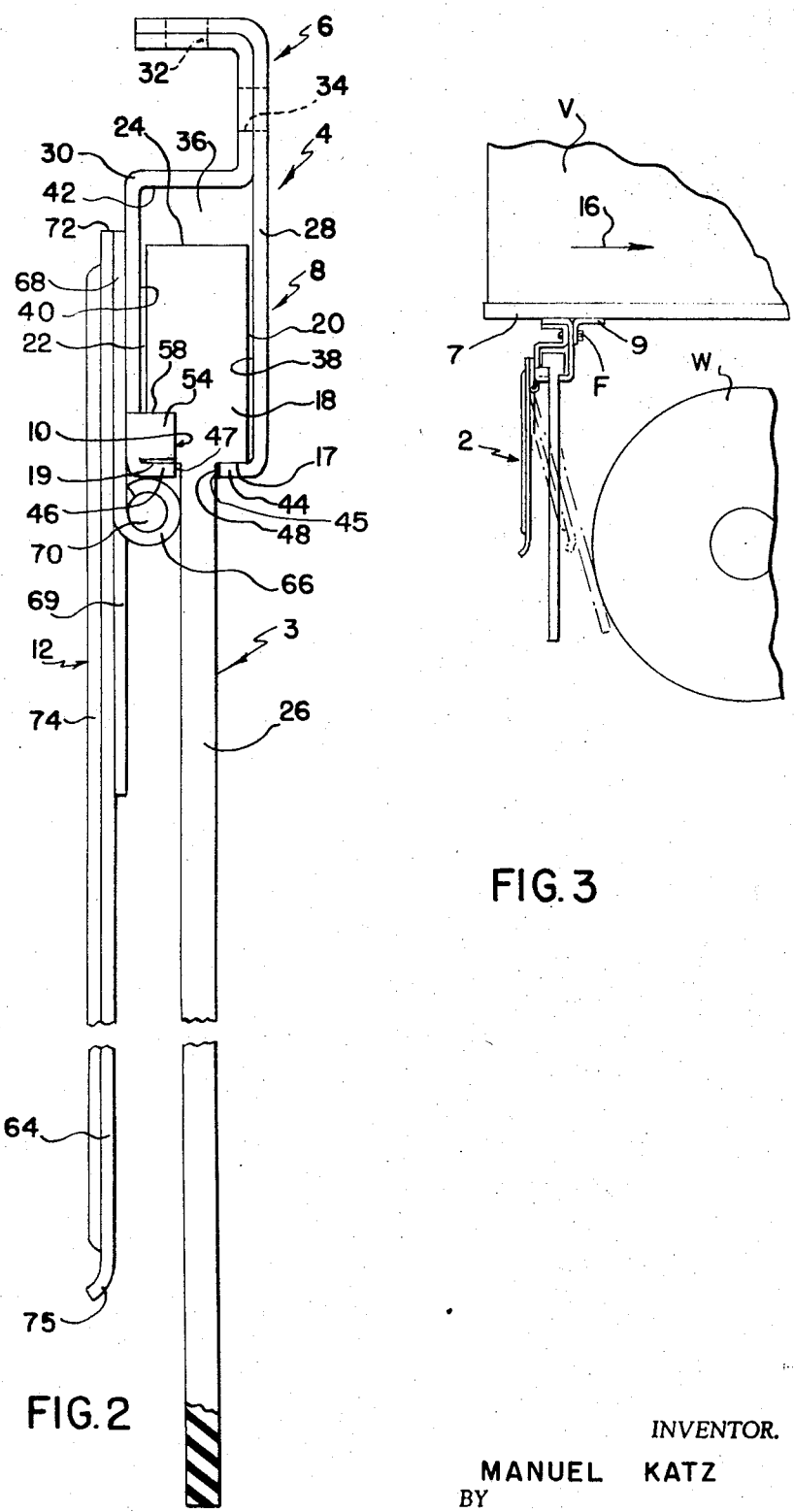

VEHICLE GUARD AND MOUNTING ASSEMBLY

BACKGROUND OF THE INVENTION

The present invention relates to vehicle guards and mounting assemblies therefor, and more particularly relates to a flexible splash guard and mounting assembly of the type for use on vehicles, such as automobiles, trucks, trailers or the like, to control the deflection of materials, such as water, dirt or the like, thrown from the wheels of such vehicles.

Heretofore, various types of splash guard and/or mounting assemblies have been provided, but which are not entirely satisfactory for the aforementioned purposes. Such arrangements are subject to numerous deficiencies including the difficulties and inconveniences encountered in the initial installation of the mountings or the replacement of the splash guard which often have a relatively short wear life and/or which may become defective due to abrasion, corrosion or other environmental conditions. In the main, such arrangements do not satisfactorily lend themselves to quick and efficient mounting and/or assembly with respect to the component parts thereof. In addition, such arrangements do not satisfactorily restrict "sailing" or the tendency of the guard to swing rearwardly upon forward movement of the vehicle without the requirement to employ auxiliary stabilizing parts or equipment. More recently, attempts have been made to overcome such problems by the fabrication of specially designed splash guards incorporating ribbed or corrugated constructions formed in the material of the guard and/or by the addition of rigid reinforcement elements. However, such arrangements are not only costly to produce but are not satisfactory in achieving the intended function of the splash guard, particularly at relatively high vehicle speeds.

A typical splash guard and mounting assembly known in the prior art is disclosed in the U.S. Pat. No. 3,285,624, to H. S. Arber et al, issued Nov. 15, 1966.

SUMMARY OF THE INVENTION

The present invention contemplates the provision of an improved construction for a vehicle splash guard and mounting assembly comprising a mounting bracket including attachment means adapted for connection to the vehicle frame. The mounting bracket includes a cartridge retainer member adapted for mounting a flexible, cartridgelike headed splash guard in slidable telescopic disconnect relation therein for ready installation or removal therefrom. The retainer member includes abutment means which acts to limit lateral shifting movement of the headed splash guard relative to said mounting bracket and yet which enables quick installation and/or removal from said retainer member. An antisail device is pivotally mounted in cantilever relation on said mounting bracket adapted for substantially rigid coacting engagement with said splash guard to selectively limit its rearward swinging movement upon forward movement of said vehicle and for yieldable coacting engagement with said guard to selectively control its forward swinging movement upon rearward movement of said vehicle and/or upon encountering an abutment or the like during the normal operation of said vehicle.

By the foregoing arrangement, there is provided a novel and improved construction for a flexible, vehicle splash guard and mounting assembly therefor which is of a simple, yet rugged arrangement that is economical to produce and which can be quickly installed without the requirement to employ ancillary parts and/or equipment. This construction eliminates the need to use multipart mounting brackets including their required attachment fasteners, such as nuts, bolts or the like, which parts are not only subject to wear, breakage and corrosion, but which are oftentime difficult and time consuming to install, particularly under adverse environmental conditions. Furthermore, this construction effectively maintains the "sailing" of the splash guard within optimum desired range to enable the guard to perform its intended function. In addition, this construction enables the splash guard to yield in a forward direction upon rearward movement of the vehicle and/or when the splash guard encounters or strikes an abutment, such as a loading dock or the like, thereby to prevent damage or wear thereto so as to extend the useful life thereof.

BRIEF DESCRIPTION OF THE DRAWINGS

FIG. 2 is an enlarged, fragmentary side elevation view of the splash guard and mounting assembly of FIG. 1 when looking from the right-hand side thereof; and FIG. 3 is a fragmentary, side elevation view, on a reduced scale, of the splash guard and mounting assembly of the present invention shown in its normal generally vertically oriented condition (solid line) and in its forwardly pivoted condition (dotted line) such as upon rearward movement of the vehicle.

DESCRIPTION OF THE PREFERRED EMBODIMENTS

Figure 1:
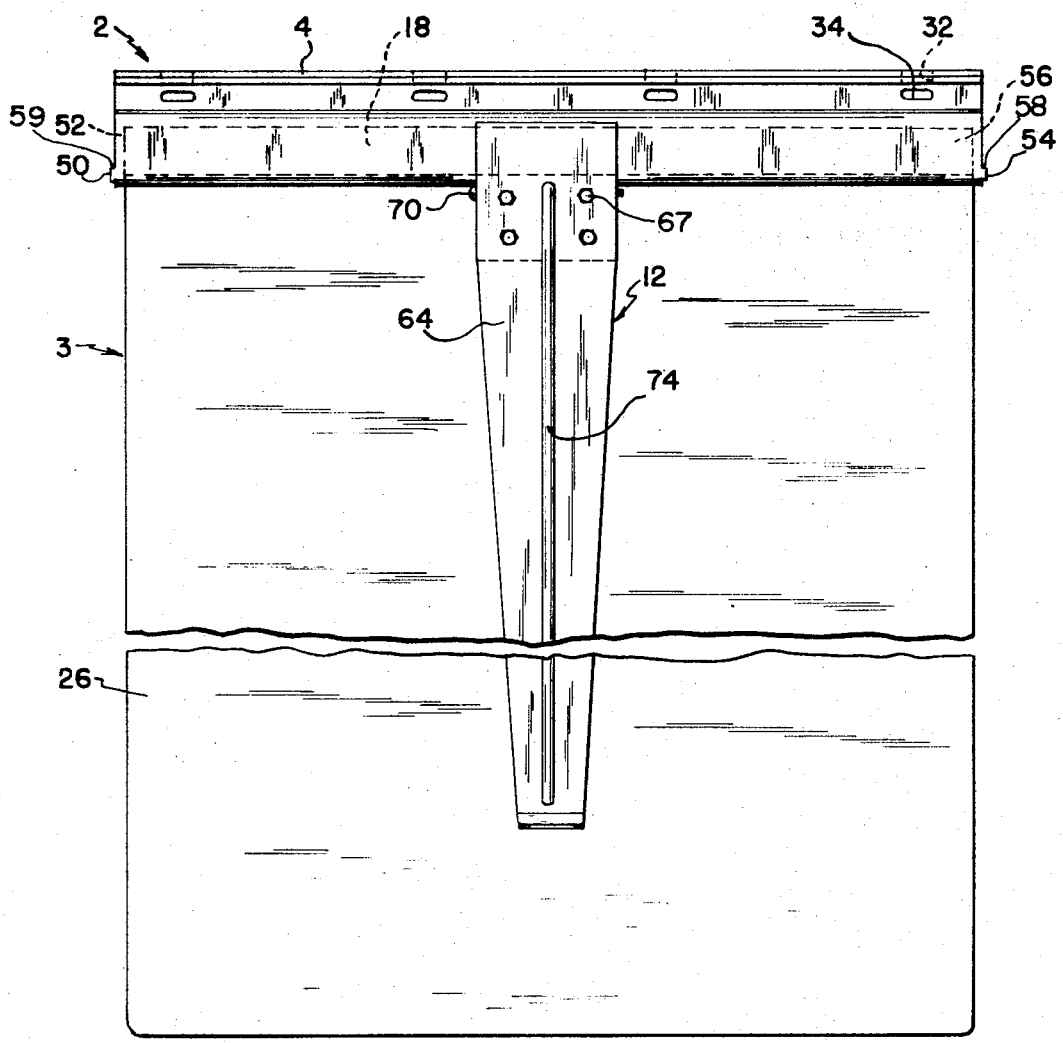
FIG. 1 is a fragmentary rear elevation view of the splash guard and mounting assembly of the present invention.

Referring again to FIGS. 1 and 3 of the drawings, the splash guard assembly of the present invention, designated generally at 2, is illustrated for detachable connection to the frame of a vehicle V, such as a truck, trailer or the like. As best seen in FIG. 3, the splash guard assembly 2 is mounted on the vehicle rearwardly of its wheels W so as to intercept and/or deflect any material, such as water, dirt or the like, which may be thrown rearwardly due to the centrifugal force from the wheels during normal operation of the vehicle.

In general, and as best shown in FIG. 2, the splash guard assembly 2 comprises a flexible splash guard member 3 and a mounting bracket 4 for detachable supporting the splash guard member 3 on the frame of the vehicle. In the form shown, the bracket 4 includes an attachment means 6 disposed adjacent its upper end for attachment to the under frame 7 (FIG. 3) of the vehicle, and a cartridge retainer member 8 disposed adjacent its opposed lower end adapted to slidably receive in telescopic relation a cartridgelike headed portion 18 of the splash member 3 therein. The bracket 4 is preferably open adjacent at least one end to enable the splash guard member 3 to be inserted transversely into the retainer member 8. The retainer member 8 includes an abutment means 10 for holding the headed portion 18 of the splash guard 3 therein and to prevent lateral shifting movement of the guard during normal usage thereof. An antisail device 12 is pivotally mounted in cantilever relation on the bracket 4 so as to extend generally downwardly therefrom and in a lengthwise direction with respect to the splash guard 3. By this arrangement, the device 12 provides a substantially rigid support to maintain the splash guard member 3 in a generally vertically oriented position so as to limit "sailing" or rearward swinging movement of the guard when the vehicle moves in a forward direction, as indicated by the arrow 16 in FIG. 3. In addition, the device 12 is mounted for pivotal movement in a forward direction (dotted line) so as to engageably coact with the splash guard member 3 to control its swinging movement in a forward direction (dotted line) upon rearward movement of the vehicle or upon engagement with an abutment, such as a loading dock or the like (not shown), thereby to prevent damage to the splash guard and bracket, as aforesaid.

In the invention, the guard member 3 may be of any suitable configuration, such as the generally rectangular shape shown when viewed in rear (FIG. 1) elevation. The guard member 3 may be made of any suitable flexible material, such as rubber, plastic or the like. The guard member has a head adapted to be received in a cartridgelike manner by the retainer member 8. In the embodiment of FIG. 2, the head portion 18 has a generally T-shaped configuration when viewed in side elevation, and is of an enlarged polygonal, such as rectangular, shape which is defined by generally flat parallel front and rear surfaces 20 and 22 and a generally flat upper edge surface 24. A generally flat tail portion 26 of reduced thickness is made integral with the head portion 18 and extends generally vertically downwardly therefrom in the installed position thereof.

Preferably, the tail portion 26 is centrally disposed with respect to the major axis of the head portion 18 to form a pair of oppositely disposed transversely extending shoulders 17 and 19 which are adapted to be supportingly engaged by the bracket 4. Preferably, the bracket 4 comprises a pair of elongated generally rigid channel members 28 and 30 (FIG. 2) which may be made of any suitable generally rigid material, such as metal, plastic or the like, and which may be suitably affixed to one another, such as by welding or the like, to provide a unitary one-piece structure. As shown, the channel members 28 and 30 are preferably of a generally inverted C-shaped and generally S-shaped configuration, respectively. The upper ends of each of the channel members 28 and 30 may be complementary shaped, such as of an inverted L-shaped so that their confronting surfaces may be fixed to one another, such as by welding or the like, to provide the attachment means 6 for the bracket 4. Such attachment means 6 has a generally C-shaped or U-shaped configuration with angularly offset apertures 32 and 34 which are adapted to receive therethrough suitable fasteners F (FIG. 3), such as screws, bolts or the like, for detachably connecting the bracket 4 to a angle iron 9 or the like attached to the under frame 7 of the vehicle.

In the invention, the retainer member 8 (FIG. 2) is of a hollow construction defined in part by the opposed ends of the channel members 28 and 30 which are disposed in spaced, parallel relationship to provide a transversely polygonal shaped opening 36 adapted to slidably receive in telescopic relation the head portion 18 of the guard member 3 therein. The opening 36 is defined by front 38, rear 40 and upper 42 walls which extend in generally parallel relation with respect to one another, as shown. Preferably, the transverse distance between the walls 38 and 40 is slightly greater than the maximum transverse thickness between the front 20 and rear 22 surfaces of the head portion 18 so that the latter may be easily slid and dropped into the opening 36 and yet, to provide a snug fit to minimize movement of the head portion 18 with respect to the retainer member 8.

The lower distal ends of the channel members 28 and 30 are preferably bent inwardly in a direction toward one another to provide flanges 44 and 46 which extend laterally of the retainer member 8 to provide a seatlike construction for supporting the head portion 18 via its shoulders 17 and 19. As shown, the flanges 44 and 46 terminate adjacent inner marginal edges in terminal portions 45 and 47 which are disposed in spaced, generally parallel relationship with respect to one another so as to provide a lengthwise extending slot 48 therebetween. The slot 46 is adapted to receive therethrough a portion of the tail member 26 and to this end preferably has a transverse width which is slightly greater than the maximum transverse width of the tail member 26 so that an optimum surface area of the shoulders 17 and 19 will be disposed in engagement with the confronting area presented by the flanges 44 and 46 in the installed position of the splash guard 3.

To hold the splash guard 3 in seated position within the retainer member 8, the bracket 4 which is of a generally open ended construction is preferably provided with abutments or tabs 50 and 54 which extend transversely of the opening 36 adjacent its opposed ends to provide a stop for engagement with the opposed ends 52 and 56 of the head portion 18. The tabs 50 and 54 may be made integral, such as by welding or the like, to the walls 38 and 40 and/or the flanges 44 and 46 of the bracket 4. By this arrangement, the tabs 50 and 54 coact to prevent lateral shifting movement of the head portion 18 and hence, the splash guard 3 with respect to the bracket 4 in the installed position thereof. Moreover, due to the gravitional weight of the guard member 3 as well as the force imparted thereto by air flow directed against the tail member 26, the head portion 18 will be maintained in tight seated engagement with respect to the flanges 44 and 46 so as to prevent the head portion 18 from moving up and over the tabs 50 and 54 in the seated position therebetween.

To facilitate insertion of the head portion 18 into sliding telescopic relation into the opening 36, the tabs 50 and 54 are preferably positioned outwardly of the slot 48 with the transverse distance between the upper marginal edges 58 and 59 of the tabs and the upper wall 32 being greater than the transverse height of the head portion 18 between its upper edge surface 24 and the shoulders 17 and 19. Although only one pair of tabs 50 and 54 have been shown, it is to be understood that additional tabs may be provided, as desired.

In the invention, the antisail device 12 is of an elongated generally rigid construction made from sheet metal or the like and depends downwardly in cantilevered relation from the bracket 4 (FIG. 1) to provide a generally T-shaped configuration, as shown. The device 12 in the embodiment shown includes an elongated lever arm 64 which tapers in a direction away from the bracket 4 and which is pivotally connected thereto for engagement with the tail portion 26 of the splash guard 3. This pivotal connection is preferably provided by a hinge construction 66 which includes an upper retainer plate 68 which may be fixedly connected adjacent its upper end, such as by weldments or the like, to the confronting outer surface of the channel member 30 and a lower attachment plate 69 which may be detachably connected to the lever arm 64 (FIG. 1) by suitable fasteners 67, such as bolts or the like. The lower and upper ends of the respective plates 68 and 69 may be bent to provide a looplike hinge 71 of the type to receive a slide pin 70 therethrough for connecting the plates 68 and 69 together in a hinged relation. By this arrangement and since the upper retainer plate 68 is fixedly attached to the bracket 4, the lower attachment plate 69 and hence, the lever arm 64 are free to pivot about the horizontal axis of the pin 70 for swinging engagement with the tail portion 26 of the splash guard 3. In addition, the plate 69 is preferably spaced downwardly from the upper marginal edge 72 of the lever arm 64 so that the upper end of the arm 64 extends upwardly beyond the longitudinal axis of the pin 70. By this arrangement, the upper portion of the lever arm 64 will abuttingly engage the confronting outer surface of the upper plate 68 so as to limit its pivotal movement in a clockwise direction (FIG. 2) with respect to the pivotal axis of the pin 70. Moreover, the lever arm 64 is free to pivot in a counterclockwise direction about the pivot axis 70, but is limited in its clockwise movement so as to be retained in a generally vertically oriented position in the normal operating or roading condition of the vehicle, as best seen in FIG. 3.

To enhance the rigidity characteristics of the lever arm 64, the arm may be provided with a lengthwise extending outwardly depressed curved rib 74 which strengthens the rigidity characteristics of the arm in a lengthwise direction. By this arrangement, the lever arm 64 provides a substantially rigid support for engageable coaction with the tail portion 26 of the splash guard 3 to hold the same in a generally vertically oriented position when the vehicle moves in a forward direction. In addition, the lever arm 64 may be bent or flared outwardly adjacent its lower end, as at 75, to provide a smooth coacting engagement with the confronting outer surface of the tail portion 26 of the splash guard 3, as desired.

By the arrangement of the present invention, the splash guard is disposed inwardly and downwardly of the top surfaces of abutments 50 and 54. Such arrangement provides for speed of assembly and for retention of the splash guard by friction and gravity, when desired.

The antisail device reduces the load forces on the guard. Thus, where the guard is attached in accordance with the embodiments of FIGS. 1 and 2, or modifications thereof, the inclusion of the antisail device of the present invention has the additional advantage of coacting with the frictional forces of the bracket to hold the splash guard in place under high speeds since it limits the tortional forces applied to the splash guard and bracket connection to a tolerable level. This prevents the splash guard from being ripped from its connection due to the wind forces acting on the splash guard when the vehicle is travelling at high speeds. At the same time, the forward pivotal feature of the anti sail device protects it from being knocked out of alignment. This feature enhances the practicality of the antisail device and enables it to retain its ability to coact with the bracket in holding the splash guard in place even though the truck has backed into an object which otherwise would have damaged the bracket.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claimed.

I claim:

1. A guard assembly for use with vehicles comprising:
   a bracket means adapted for mounting a splash guard member on a vehicle;
   an antisail means mounted on said bracket means;
   said antisail means including a substantially rigid arm pivotally connected to said bracket means adapted for engageable coaction with said splash guard member;
   said arm extending generally downwardly from said bracket means being spaced from said splash guard member for controlling swinging movement thereof; and
   abutment means operably associated with said bracket means and said arm for limiting pivotal movement thereof in a direction away from said splash guard member and to enable free pivotal movement thereof in the opposite direction toward said splash guard member.

2. A guard assembly in accordance with claim 1 wherein:
   said bracket means includes a retainer member adapted to receive said splash guard member in cartridgelike retention; and
   said splash guard member includes a body made from a flexible material, said body comprising an enlarged cartridgelike head end portion and a reduced width tail portion depending from said head end portion.

3. A guard assembly in accordance with claim 2, wherein said head end and tail portion together define a generally T-shaped in side elevation, configuration.

4. A guard assembly in accordance with claim 3, wherein:
   said retainer member is of an elongated hollow construction having a slotlike opening therein for receiving the tail portion of said splash guard member therethrough; and
   the juncture of said head end portion with said tail portion defines a pair of oppositely disposed shoulder portions adapted for seated engagement with said retainer member.

5. A guard assembly in accordance with claim 2, wherein:
   said retainer member is free of any attachment elements extending through the material of said splash guard member; and
   said retainer member includes upwardly projecting means adapted to maintain said splash guard member in the installed position thereof.

6. A guard assembly in accordance with claim 1, wherein said arm extends downwardly from said bracket means in generally vertically oriented relation being adapted for pivotal movement about a generally horizontal axis.

7. A guard assembly in accordance with claim 1, wherein:
   said antisail means includes a hinge member pivotally connecting said arm with said bracket means; and
   said hinge member having a generally horizontal pivotal axis to enable free pivotal movement of said arm in a direction toward said splash guard member.

8. A guard assembly in accordance with claim 7, wherein:
   said arm member includes upper and lower ends;
   said hinge member being connected to said arm between said upper and lower ends thereof; and
   said upper end of said arm extending upwardly above said hinge member being adapted for abutting engagement with said bracket means to limit pivotal movement thereof in a direction away from said splash guard member.

9. A guard assembly for use with vehicles comprising:
   a bracket means adapted for mounting a splash guard member on a vehicle;
   said bracket means including an elongated, hollow retainer member;
   said splash guard member including an enlarged head end portion and a reduced width tail portion depending from said head end portion and adapted to be received in cartridgelike relation within said retainer member;
   an antisail means mounted on said bracket means;
   said antisail means including a substantially rigid arm pivotally connected to said bracket means adapted for engageably coaction with said splash guard member;
   said arm extending generally downwardly from said bracket means being spaced from said splash guard member for controlling swinging movement thereof; and
   abutment means operably associated with said bracket means and said arm for limiting pivotal movement thereof in a direction away from said splash guard member and to enable free pivotal movement thereof in the opposite direction toward said splash guard member.